(12) United States Patent
Chen et al.

(10) Patent No.: US 10,496,201 B2
(45) Date of Patent: Dec. 3, 2019

(54) TOUCH INPUT DEVICE

(71) Applicant: SUNREX TECHNOLOGY CORP., Taichung (TW)

(72) Inventors: Chun-Chieh Chen, Taichung (TW); Ching-Yao Huang, Taichung (TW); Ling-Cheng Tseng, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 16/113,337

(22) Filed: Aug. 27, 2018

(65) Prior Publication Data
US 2019/0317619 A1    Oct. 17, 2019

(30) Foreign Application Priority Data

Apr. 13, 2018  (TW) .............................. 107112767 A

(51) Int. Cl.
| | | |
|---|---|---|
| *G06F 3/033* | (2013.01) | |
| *G06F 1/16* | (2006.01) | |
| *G06F 3/047* | (2006.01) | |
| *G06F 3/041* | (2006.01) | |
| G06F 3/0354 | (2013.01) | |

(52) U.S. Cl.
CPC .......... *G06F 3/041* (2013.01); *G06F 3/03547* (2013.01)

(58) Field of Classification Search
CPC .............................. G06F 3/041; G06F 3/03547
USPC ....................................................... 345/173
See application file for complete search history.

(56) References Cited

U.S. PATENT DOCUMENTS

| | | | | |
|---|---|---|---|---|
| 5,355,148 A | * | 10/1994 | Anderson | G06F 1/1616 341/31 |
| 5,920,310 A | * | 7/1999 | Faggin | G06F 1/1616 178/18.01 |
| 6,177,924 B1 | * | 1/2001 | Bae | G06F 1/169 345/157 |
| 6,281,887 B1 | * | 8/2001 | Wang | G06F 3/03547 345/173 |
| 6,859,355 B2 | * | 2/2005 | Chuang | G06F 1/169 345/158 |
| 7,119,291 B2 | * | 10/2006 | Sun | G06F 1/1616 200/5 A |
| 7,544,904 B2 | * | 6/2009 | Nakatani | G06F 1/1616 200/5 A |
| 7,551,160 B2 | * | 6/2009 | Lee | G06F 3/03547 345/156 |
| 8,552,991 B2 | * | 10/2013 | Yoon | G06F 1/1616 345/173 |
| 8,803,852 B2 | * | 8/2014 | Tsai | G06F 3/03547 345/173 |

(Continued)

*Primary Examiner* — Benyam Ketema
(74) *Attorney, Agent, or Firm* — Burris Law, PLLC

(57) ABSTRACT

A touch input device includes a base board, an upper board, and a touch unit. The base board has an elongate opening having opposite opening ends respectively defined by two end walls. The upper board is disposed on and above the base board and includes a touched sensing member. The touch unit is mounted to the base board and includes two positioning seats, a contact element, and two resilient arms. The positioning seats respectively abut against the end walls. The contact element corresponding in position to the touched sensing member is disposed. Each resilient arm interconnects the contact element and a respective one of the positioning seats.

11 Claims, 7 Drawing Sheets

(56) References Cited

U.S. PATENT DOCUMENTS

| | | | | |
|---|---|---|---|---|
| 8,866,033 B2* | 10/2014 | Xue | ............... | G06F 1/169 |
| | | | | 200/343 |
| 9,465,416 B2* | 10/2016 | Shen | ............... | G06F 1/1692 |
| 2008/0266775 A1* | 10/2008 | Song | ............... | G06F 1/1616 |
| | | | | 361/679.22 |
| 2010/0103611 A1* | 4/2010 | Yang | ............... | G06F 1/1616 |
| | | | | 361/679.55 |
| 2010/0300772 A1* | 12/2010 | Lee | ............... | G06F 3/03547 |
| | | | | 178/18.06 |
| 2014/0313648 A1* | 10/2014 | Yang | ............... | G06F 1/169 |
| | | | | 361/679.01 |
| 2017/0038801 A1* | 2/2017 | Lee | ............... | G06F 1/1656 |

* cited by examiner

TOUCH INPUT DEVICE

CROSS-REFERENCE TO RELATED APPLICATION

This application claims priority of Taiwanese Patent Application No. 107112767, filed on Apr. 13, 2018.

FIELD

The disclosure relates to an electronic device, and more particularly to a touch input device for a mobile electronic device.

BACKGROUND

A notebook computer is usually equipped with a keyboard and a touchpad or a trackpad to serve as input interfaces. Generally, a touchpad substitutes for a mouse and includes a touch sensing surface capable of translating a motion and position of a user's fingers to relative positions to be displayed as a cursor and a plurality of clickable buttons serving as right, left and center buttons of a mouse.

Taiwanese Invention Patent No. I535366 discloses a supporting device for supporting a touched sensing module of a notebook. The supporting device includes a bottom frame and a supporting plate mounted slantly in the bottom frame and having two opposite ends that abut against the frame. The touched sensing module is supported by and disposed on the supporting plate. When an external force is exerted on the touch sensing module, a contact element of the touch sensing module is moved into contact with the supporting plate to counteract a biasing force provided by the supporting plate which serves as a sense of tactile to the user. However, the high-rigidity structure of such supporting device results in a relatively high click ratio (snap ratio) that provides a discomfort sense of tactile to the user.

SUMMARY

Therefore, an object of the disclosure is to provide a touch input device that can alleviate the drawback of the prior art.

According to the disclosure, a touch input device is provided to include a base board, an upper board unit and a touched. The base board has a first side rib extending in a first direction, a second side rib extending in the first direction and opposite to the first side rib in a second direction transverse to the first direction, a top surface, a bottom surface, and an opening formed at a middle portion of the second side rib. The opening is elongate and has two opening ends respectively defined by two end walls and opposite to each other in the first direction, and an intermediate opening portion located between the two opening ends. The upper board is disposed on and above the base board, and has a first side connected to the first side rib of the base board and a second side opposite to the first side of the upper board in the second direction and movable relative to the second side rib of the base board, a touched sensing member disposed at a middle portion of the second side of the upper board. The touch unit is mounted to the base board, and includes a pair of positioning seats, a contact element, and a pair of resilient arms. The positioning seats respectively abut against the end walls. The contact element is disposed between the positioning seats and corresponds in position to the intermediate opening portion. Each of the resilient arms interconnects the contact element and a respective one of the positioning seats. When an external force is exerted on the touch sensing member, the touch sensing member is moved into contact with the contact element such that the contact element is moved toward the bottom surface by resilient deformation of the resilient arms.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
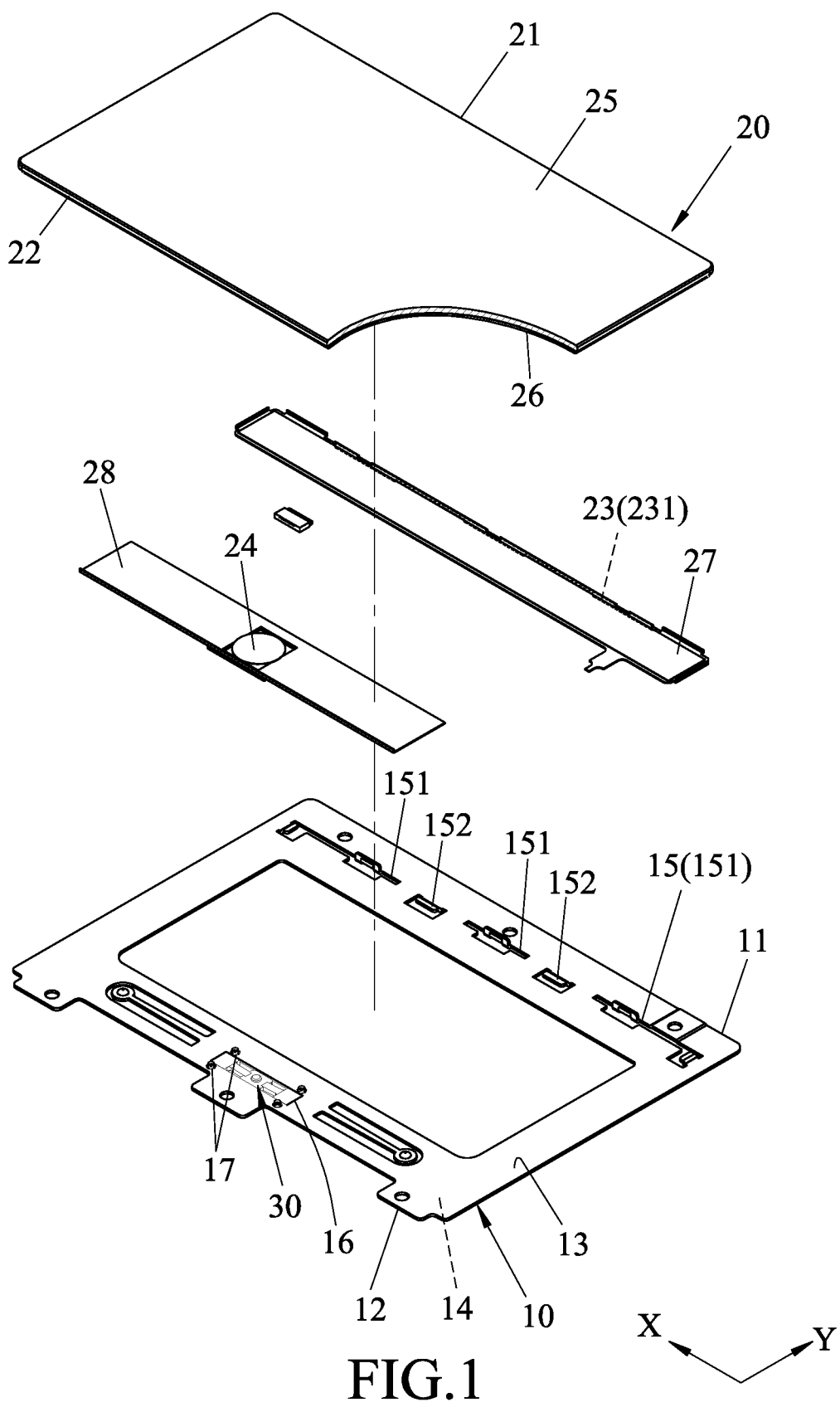
FIG. 1 is a partly sectional, exploded perspective view of a touch input device according to an embodiment of the present disclosure.
Figure 2:
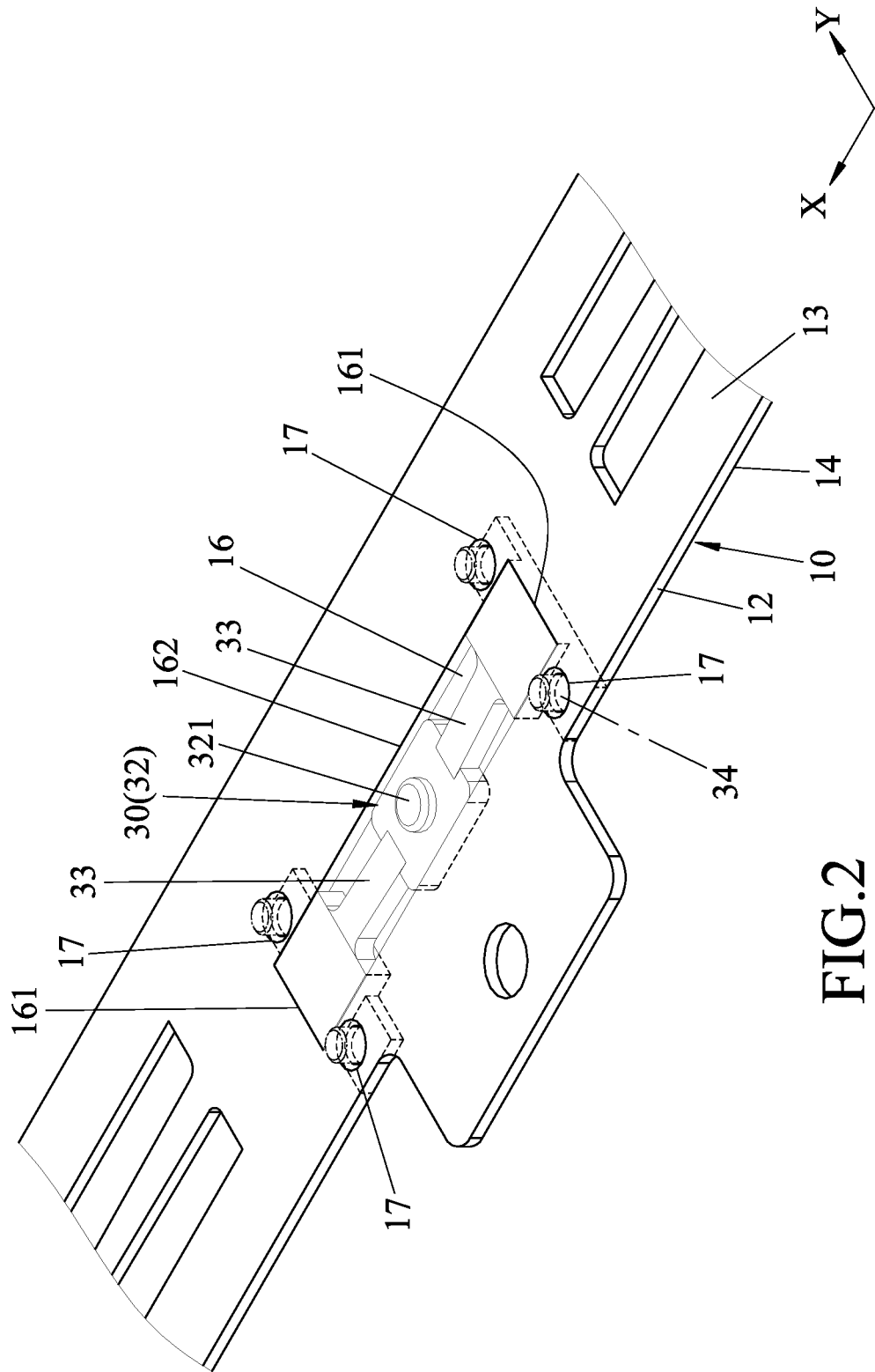
FIG. 2 is a fragmentary enlarged view of a base board of the touch input device.
Figure 3:
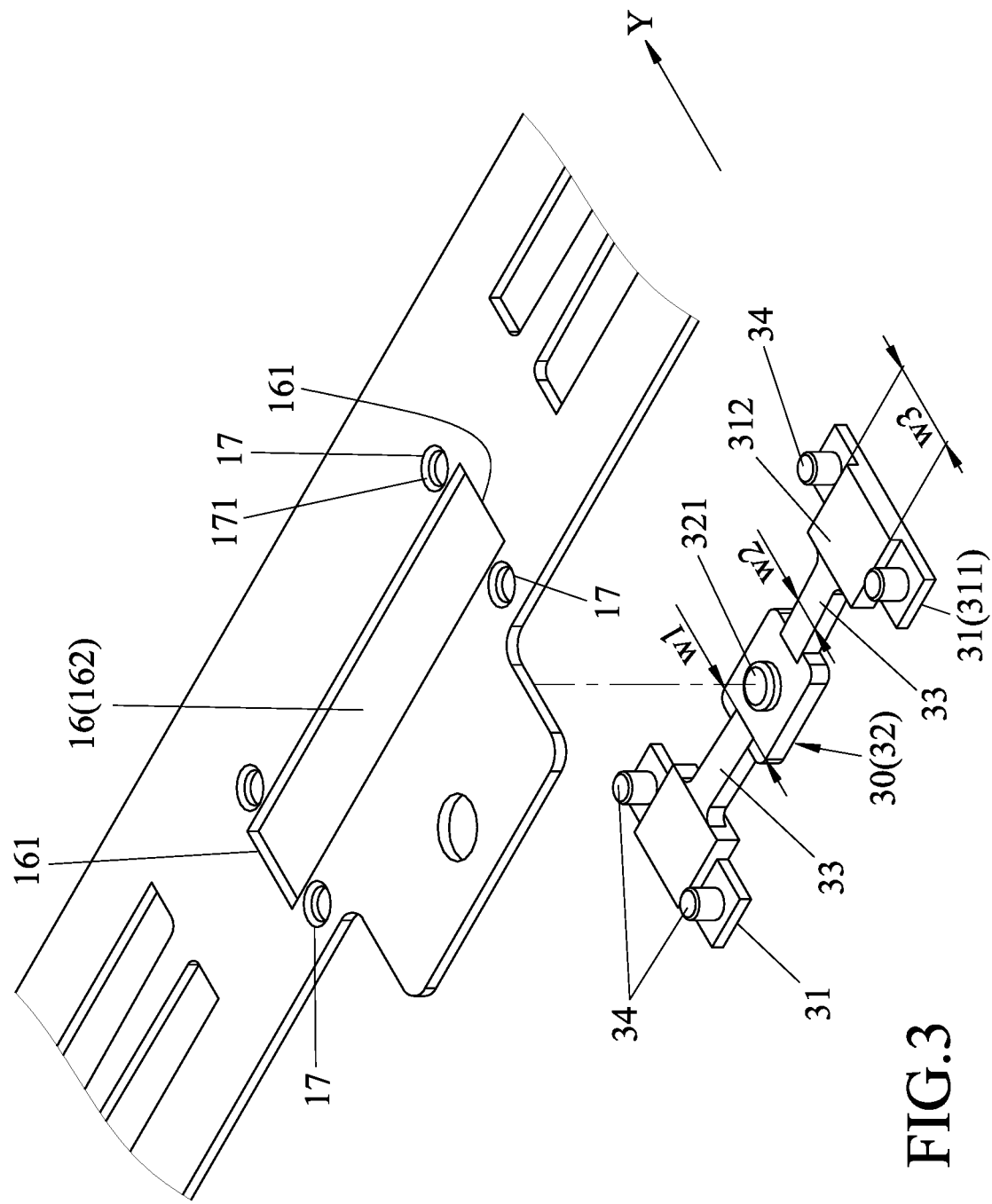
FIG. 3 is an exploded perspective view of FIG. 2.

Referring to FIGS. 1 to 2, an embodiment of a touch input device according to the disclosure mounted on a notebook (see FIG. 4) and serving as input device of the notebook is provided. The touch input device includes a base board unit 10, an upper board 20 and a touched 30.

The base board 10 has a first side rib 11 extending in a first direction (X), a second side rib 12 extending in the first direction (X) and opposite to the first side rib 11 in a second direction (Y) transverse to the first direction (X), a top surface 13, a bottom surface 14, a lower connecting portion 15 disposed adjacent to the first side rib 11, and an opening 16 formed at a middle portion of the second side rib 12. The opening 16 is elongate and has two opening ends respectively defined by two end walls 161 and opposite to each other in the first direction (X), and an intermediate opening portion 162 located between the two opening ends. The base board 10 is formed with two pairs of through holes 17 extending through the top surface 13 and the bottom surface 14 and disposed respectively in proximity of the two opening ends of the opening 16. For each pair of the through holes 17, the through holes 17 are spaced apart from each other in the second direction (Y). Further, referring to FIG. 6, each of the through holes 17 has a small diameter hole portion 172 and a large diameter hole portion 171 formed in the top surface 13 and having a diameter larger than that of the small diameter hole portion 172. The lower connecting portion 15 is formed with three through holes 151 spaced apart from one another in the first direction (X) and extending through the top surface 13 and the bottom surface 14 and two supporting seats 152 spaced apart from each other in the first direction (X) and arranged alternately with the through holes 151.

The upper board 20 is disposed on and above the base board 10, and includes a top layer 25, a first side 21, a second side 22, a circuit board module 26, an upper connecting portion 23, a touched sensing member 24, a rear supporting plate 27 and a front supporting plate 28. The first side 21 is connected to the first side rib 11 of the base board 10. The second side 22 is opposite to the first side 21 in the second direction (Y), corresponds in position to the second side rib 12 of the base board 10 and is movable relative to the second side rib 12 of the base board 10. The circuit board module 26 is disposed under the top layer 25. The rear supporting plate 27 and the front supporting plate 28 are disposed under the circuit board module 26 and are respectively adjacent to the first side 21 and the second side 22. The touch sensing member 24 is disposed on the front supporting plate 28. The upper connecting portion 23 is disposed on the rear supporting plate 27, and includes a plurality of insertion fins 231 spaced apart from one another in the first direction (X) and extending respectively into the through holes 151 of the lower connecting portions 15 of the base board 10 such that the upper board unit 20 is connected fixedly to the base board 10. Further, the rear supporting plate 27 is disposed on and abuts against the supporting seats 152 of the lower connecting portion 15 such that the second side 22 is movable relative to the second side rib 12 of the base board 10.

Further referring to FIGS. 3 to 6, the touched 30 is mounted to the base board 10 in proximity to the second side rib 12, and includes a pair of positioning seats 31, a contact element 32, a pair of resilient arms 33 and two pairs of anchoring portions 34. The positioning seats 31 respectively abut against the end walls 161. Each of the positioning seats 31 has a bottom plate portion 311 and a main portion 312. For each positioning seat 31, the bottom plate portion 311 abuts against the bottom surface 14 of the base board unit 10 and the main portion 312 is disposed on and above a middle portion of the bottom plate portion 311, has a dimension smaller than that of the bottom plate portion 311 in the second direction (Y) and the same as that of the opening 16 in the second direction (Y), and extends into the opening 16 to abut against a corresponding one of the end walls 161.

The contact element 32 is disposed between the positioning seats 31, corresponds in position to the intermediate hole portion 162 of the hole 16 and has a protrusion 321 extending toward the touch sensing member 24 for contact therewith. Each of the resilient arms 33 interconnects the contact element 32 and a respective one of the positioning seats 31. The two pairs of the anchoring portions 34 are formed respectively on the bottom plate portions 311 of the positioning seats 31, respectively extend into the through holes 17 to connect the base board 10 to the touch unit 30. Specifically, each of the anchoring portions 34 has an enlarged distal end 341 (see FIG. 6) fittingly engaging the large diameter hole portion 171 of a respective one of the through holes 17. In one embodiment, each anchoring portion 34 is configured as a pillar extending through and out of the respective through hole 17. To assemble the touched unit 30 to the base board 10, an uppermost end of each pillar is processed to be melted and thus filling the large diameter hole portion 171 of the respective through hole 17 such that the melted portion of each of the pillar forms the enlarged distal end 341 that fittingly engages the large diameter hole portion 171 of the respective through hole 17. In some embodiments, the touch unit 30 may be formed by metal and each anchoring portion 34 is configured as a rivet extending into and engaging the respective through hole 17 to connect the base board 10 to the touch unit 30.

In this embodiment, the contact element 32 has a first width (wI) in the second direction (Y), each of the resilient arms 33 has a second width (w2) in the second direction (Y) and the main portion 312 has a third width (w3) in the second direction (Y). The first width (wI) is greater than the second width (w2). The third width (w3) is greater than the first width (wI).

In this embodiment, the positioning seats 31, the anchoring portions 34, the resilient arms 33, and the contact element 32 of the touch unit 30 are integrally formed and are made of a resilient material or rubber.

Figure 4:
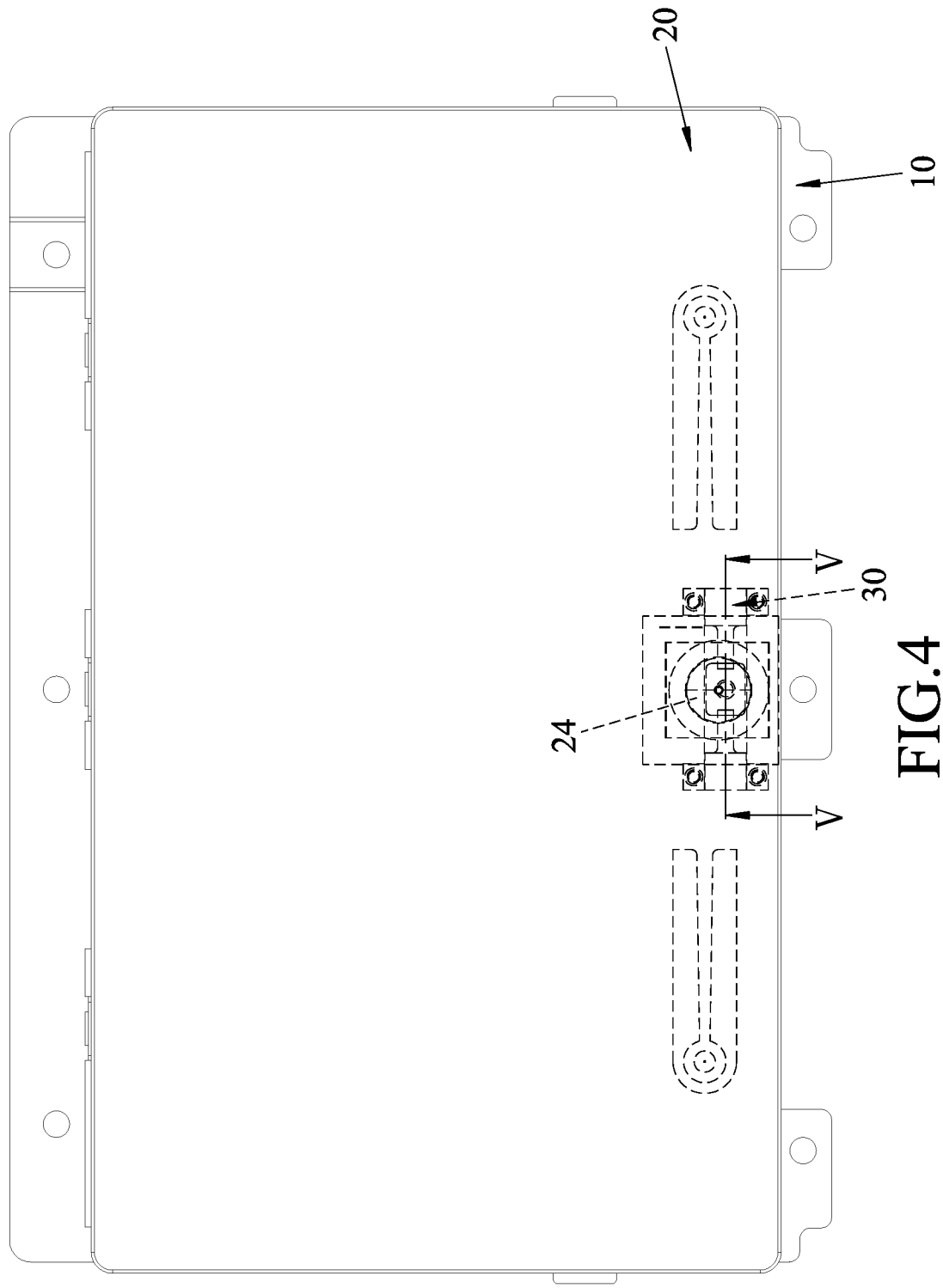
FIG. 4 is a schematic top view of the touch input device mounted to a notebook.
Figure 5:
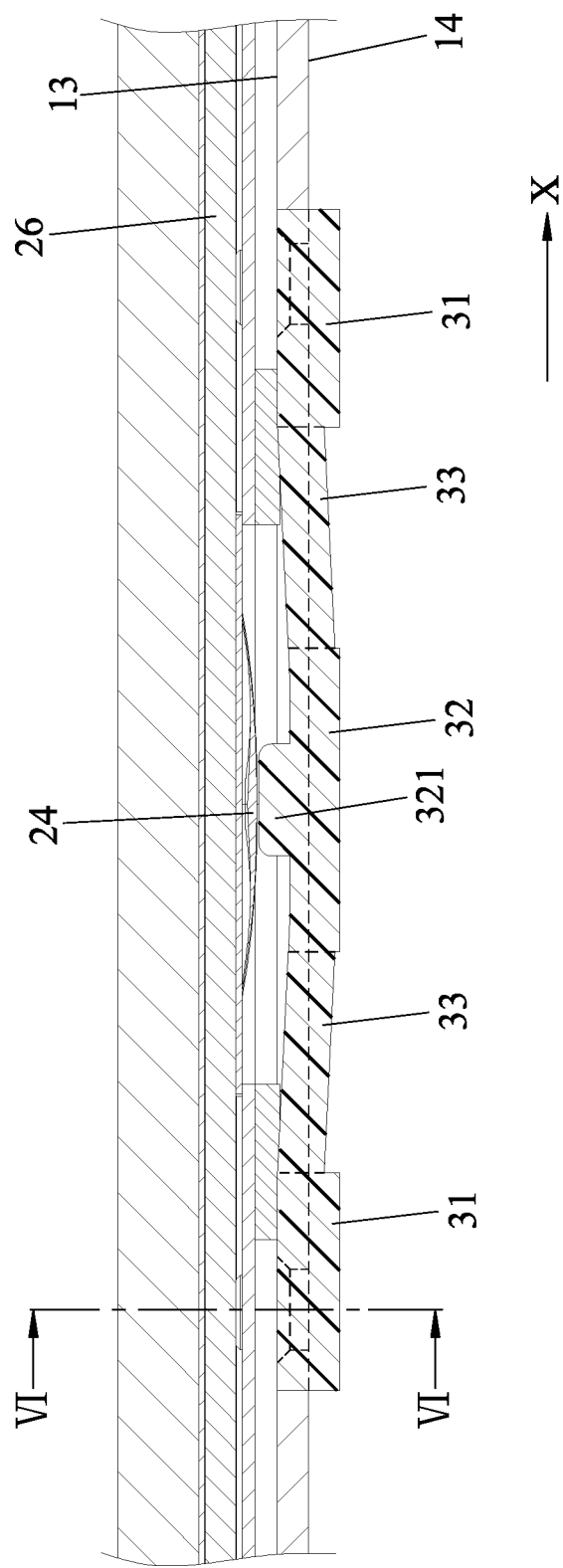
FIG. 5 is a sectional view taken along line V-V in FIG. 4.
Figure 6:
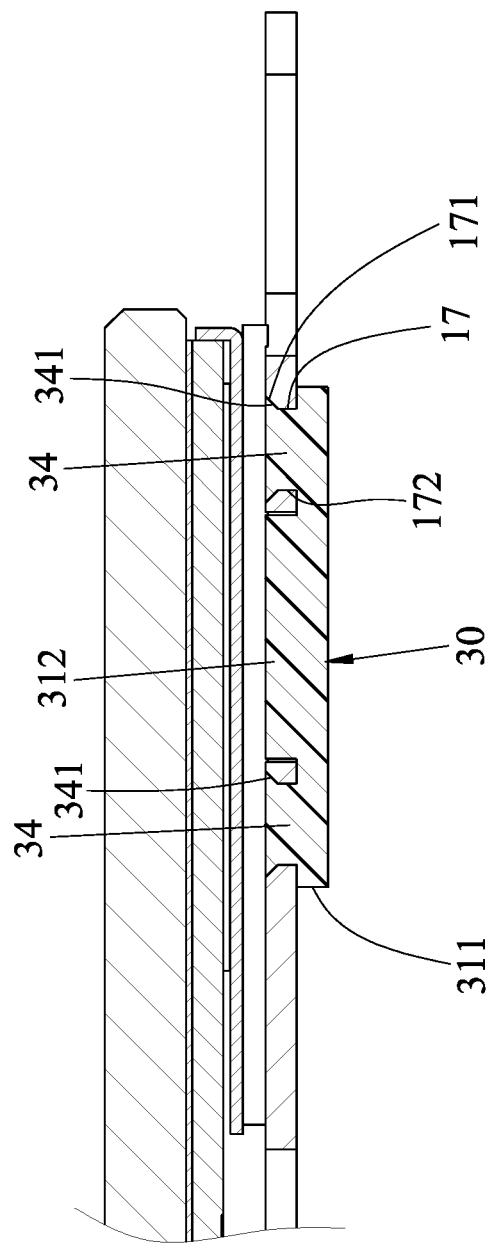
FIG. 6 is a sectional view taken along line VI-VI in FIG. 5.

Further referring to FIGS. 4 to 6, how the abovementioned structures operate will be described. FIG. 5 illustrates that the touch sensing 24 is moved into contact with the contact element 32 when an external force is exerted on the touch sensing member 24, such that the resilient arms 33 having the second width (w2) smaller than the first width (wI) of the contact element 32 enables movement of the contact element 32 toward the bottom surface 14 by resilient deformation of the resilient arms 33. Further, by virtue of the third width (w3) of the main portion 32 of each positioning seat 31 that is greater than the first width (wI) of the contact element 32, the contact element 32 stably moves in the intermediate opening portion 162 toward the bottom surface 14 when being in contact with the touch sensing 24. When the external force is released, each the resilient arm 33 returns to its original position and the contact element 32 is moved toward the top surface 13 and back to its original position.

Figure 7:
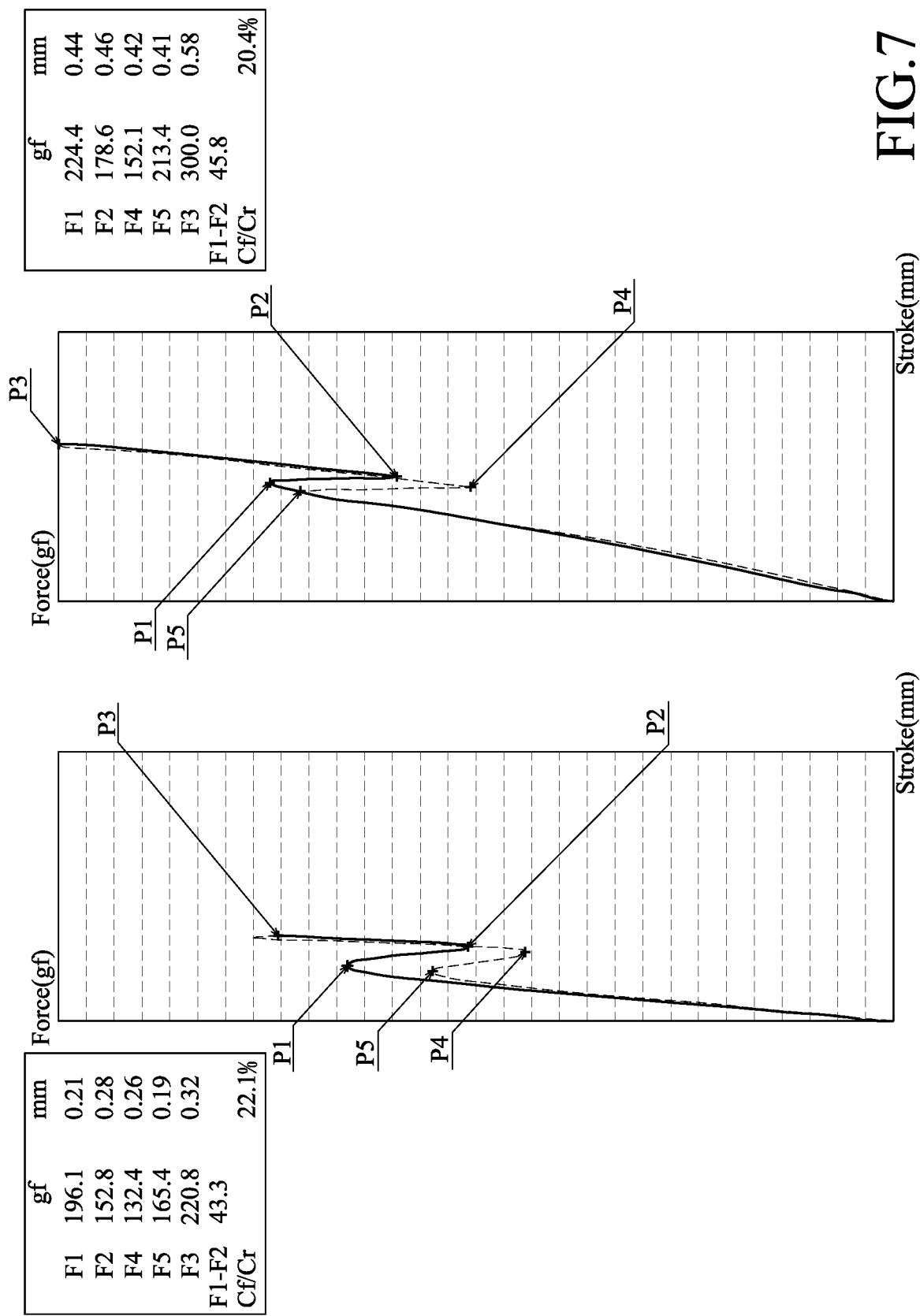
FIG. 7 illustrates two plots representing response curves of a conventional touch input device and the touch input device of the present disclosure.

Further referring to FIG. 7, two plots representing response curves of a conventional touch input device described in the background section and the touch input device of the present disclosure being touched are shown. The left one of the plots is the response curve of a touched sensing module of a conventional touch input device disclosed in the Taiwanese Invention Patent No. I535366, and the right one of the plots is the response curve of the touched sensing module 24 of the present disclosure. Each solid line represents a relationship between an exerted external force and a stroke of moving each touch sensing member of a conventional touch input device disclosed in the Taiwanese Invention Patent No. I535366, and the right one of the plots is the response curve of the touch sensing member 24 of the present disclosure. Each solid line represents a relationship between an exerted external force and a stroke of moving each touch sensing member downwardly when being touched, while each dashed line represents a relationship of the same when the external force is released. For each plot in FIG. 6, point (P1) is a breakdown position where the external force exerted on each touch sensing member causes the supporting plate of the conventional touch input device or the resilient arm 33 to start bending, point (P2) is a position where the supporting plate or the resilient arm 33 bends the most, point (P3) is a dead center where the supporting plate or the resilient arm 33 moved to the end of the stroke thereof, and force (F1)~(F5) represent amounts of the force exerted on the supporting plate or the touch sensing member at points (P1)~(P5), respectively. A click ratio (snap ratio) (Cf/Cr) for each touch sensing member can be calculated by multiplying a quotient of the difference between the values of the forces (F1, F2) divided by the value of the force (F1) by 100%. As can be seen, the click ratio of the conventional touch input device is 22.1% and the click ratio of the touch input device of the present disclosure is 20.4%, which is smaller than that of the conventional touch input device. In this way, the touch input device of the present disclosure provides a comfort sense of tactile to the user during use as compared to the conventional touch input device.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A touch input device comprising:
   a base board that has a first side rib extending in a first direction, a second side rib extending in the first direction and opposite to said first side rib in a second direction transverse to the first direction, a top surface, a bottom surface, and an opening formed at a middle portion of said second side rib, said opening being elongate and having two opening ends that are respectively defined by two end walls and that are opposite to each other in the first direction, and an intermediate opening portion located between said two opening ends;
   an upper board that is disposed on and above said base board, and that has a first side connected to said first side rib of said base board and a second side opposite to said first side of said upper board in the second direction and movable relative to said second side rib of said base board, a touch sensing member disposed at a middle portion of said second side of said upper board; and
   a touch unit mounted to said base board, and including a pair of positioning seats which respectively abut against said end walls, a contact element which is disposed between said positioning seats and which corresponds in position to said intermediate opening portion, and a pair of resilient arms, each interconnecting said contact element and a respective one of said positioning seats;
   when an external force is exerted on said touch sensing member, said touch sensing member is moved into contact with said contact element such that said contact element is moved toward said bottom surface by resilient deformation of said resilient arms.

2. The touch input device as claimed in claim 1, wherein said base board is formed with at least two through holes extending through said top surface and said bottom surface, said touch unit further including at least two anchoring portions formed respectively on said positioning seats, respectively extending into said through holes to connect said base board to said touch unit.

3. The touch input device as claimed in claim 2, wherein each of said through holes has a small diameter hole portion and a large diameter hole portion formed in said top surface and having a diameter larger than that of said small diameter hole portion, each of said anchoring portions having an enlarged distal end fittingly engaging said large diameter hole portion of a respective one of said through holes.

4. The touch input device as claimed in claim 3, wherein said positioning seats, said anchoring portions, said resilient arms, and said contact element of said touch unit are integrally formed.

5. The touch input device as claimed in claim 1, wherein said contact element has a first width in the second direction and each of said resilient arms has a second width in the second direction, the first width being greater than the second width such that the resilient deformation of said resilient arms enables movement of said touch unit toward said bottom surface.

6. The touch input device as claimed in claim 5, wherein said opening has a third width in the second direction, the third width being greater than the first width such that said contact element stably moves toward said bottom surface in said intermediate opening portion when being in contact with said touch sensing member.

7. The touch input device as claimed in claim 1, wherein each of said positioning seats has a bottom plate portion abutting against said bottom surface of said base board and a main portion disposed on and above a middle portion of said bottom plate portion, having a dimension smaller than that of said bottom plate portion in the second direction and extending into said opening to abut against a corresponding one of said end walls.

8. The touch input device as claimed in claim 7, wherein said based board is formed with at least two through holes extending through said top surface and said bottom surface, said touch unit further including at least two anchoring portions formed respectively on said bottom plate portions of said positioning seats, respectively extending into said through holes to connect said base board to said touch unit.

9. The touch input device as claimed in claim 1, wherein said contact element has a protrusion extending toward said touch sensing member for contact therewith.

10. The touch input device as claimed in claim 1, wherein said touch unit is made of a resilient material.

11. The touch input device as claimed in claim 1, wherein said touch unit is made of rubber.

* * * * *